(12) United States Patent
Acott (10) Patent No.: US 11,167,910 B2
(45) Date of Patent: Nov. 9, 2021

(54) CONTAINER AND CLOSURE WITH SUBSTANCE STORAGE MEANS

(71) Applicant: NEXT CARTEL BEVERAGES PTY LTD., South Yarra (AU)

(72) Inventor: Ben Acott, Mount Eliza (AU)

(73) Assignee: NEXT CARTEL BEVERAGES PTY LTD, Victoria (AU)

(*) Notice: Subject to any disclaimer, the term of this patent is extended or adjusted under 35 U.S.C. 154(b) by 0 days.

(21) Appl. No.: 16/882,200

(22) Filed: May 22, 2020

(65) Prior Publication Data

US 2020/0354135 A1 Nov. 12, 2020

Related U.S. Application Data

(63) Continuation of application No. 15/316,825, filed as application No. PCT/AU2014/001091 on Dec. 2, 2014, now Pat. No. 10,661,967.

(30) Foreign Application Priority Data

Dec. 2, 2013 (AU) .............................. 2013904662

(51) Int. Cl.
*B65D 81/32* (2006.01)
*A47J 31/40* (2006.01)
(Continued)

(52) U.S. Cl.
CPC ......... *B65D 81/3211* (2013.01); *A47J 31/407* (2013.01); *B65B 29/10* (2013.01);
(Continued)

(58) Field of Classification Search
CPC .... B65D 81/3211; B65D 47/06; B65D 43/02; B65D 77/20; B65D 51/2821; B65D 85/804; A47J 31/407
See application file for complete search history.

(56) References Cited

U.S. PATENT DOCUMENTS 3,410,444 A 11/1968 Morane
3,802,604 A 4/1974 Morane
(Continued)

FOREIGN PATENT DOCUMENTS

JP H 09216666 * 8/1997

OTHER PUBLICATIONS

Minoru et al., JPH 09216666, Aug. 1997 Translation.*
(Continued)

*Primary Examiner* — Viren A Thakur
*Assistant Examiner* — Chaim A Smith
(74) *Attorney, Agent, or Firm* — Procopio, Cory, Hargreaves & Savitch LLP (57) ABSTRACT

An assembly including a container having a first end and an opposing second end. The assembly also includes a housing for removably receiving a cartridge of the type including a substance storage compartment for storing a substance therein. The housing is connectable to the second end of the container. When connected to the container, the housing is movable relative to the container. A rupturing device is provided for rupturing the storage compartment upon relative movement between the housing and container, so as to combine any storage compartment contents with any container contents. The rupturing device is mounted within the container. A container opening is provided in the first end of the container; and a closure provided for sealing the container opening. The closure is movable between a closed position, and an open position for providing access to the container.

4 Claims, 8 Drawing Sheets

(51) Int. Cl.

| | |
|---|---|
| *B65D 51/28* | (2006.01) |
| *B65B 29/10* | (2006.01) |
| *B65D 43/02* | (2006.01) |
| *B65D 47/06* | (2006.01) |
| *B65D 77/20* | (2006.01) |
| *B65D 85/804* | (2006.01) |

(52) U.S. Cl.
 CPC ............. *B65D 43/02* (2013.01); *B65D 47/06* (2013.01); *B65D 51/2821* (2013.01); *B65D 77/20* (2013.01); *B65D 81/3222* (2013.01); *B65D 85/804* (2013.01)

(56) References Cited

U.S. PATENT DOCUMENTS

| | | |
|---|---|---|
| 5,170,888 A | 12/1992 | Goncalves |
| 5,419,445 A | 5/1995 | Kaesemeyer |
| 6,068,396 A | 5/2000 | Baudin |
| 6,126,032 A | 10/2000 | Herzog et al. |
| 6,135,275 A | 10/2000 | Kelders et al. |
| 6,148,996 A | 11/2000 | Morini |
| 2002/0185389 A1 | 12/2002 | Kelders et al. |
| 2004/0104247 A1 | 6/2004 | Anderson |
| 2004/0195120 A1 | 10/2004 | Anderson |
| 2004/0211742 A1 | 10/2004 | Deans |
| 2010/0055252 A1 | 3/2010 | Marina et al. |
| 2010/0108715 A1 | 5/2010 | Santagiuliana |
| 2010/0213085 A1 | 8/2010 | Belnap |
| 2010/0300904 A1 | 12/2010 | Sharon |
| 2012/0183657 A1* | 7/2012 | Marina ................ B67D 3/0058 426/394 |
| 2015/0225130 A1 | 8/2015 | Hall |

OTHER PUBLICATIONS

International Search Report and Written Opinion received in International application No. PCT/AU2014/001091 and dated Jan. 19, 2015. 10 pages.

* cited by examiner

CONTAINER AND CLOSURE WITH SUBSTANCE STORAGE MEANS

CROSS REFERENCE TO RELATED APPLICATION

This application is a continuation of U.S. patent application Ser. No. 15/316,825, filed on Dec. 6, 2016, which is a national stage entry of International Patent Application No. PCT/AU2014/001091, filed on Dec. 2, 2014, which claims priority to and the benefit of Australian Patent Application No. 2013904662, filed on Dec. 2, 2013, which are all hereby incorporated herein by reference as if set forth in full.

TECHNICAL FIELD

The present invention broadly relates to separately storing two ingestible substances within a single and at least partially re-usable assembly in a manner allowing the substances to be combined shortly before being consumed. The invention will, thus be described generally in this context. It is to be appreciated, however, that the invention need not necessarily be limited to ingestible products.

BACKGROUND OF INVENTION

It is generally desirable to store drinks, such as sports drinks, protein drinks, baby formula or other drinkable dietary supplements, in a ready-to-drink form in which the contents are already combined and mixed. This allows the drink to be packaged in a can, bottle or other container, such that the container need only be opened for the drink to be consumed.

In some instances however, it isn't desirable to package drinks in a pre-mixed state, as this can lead to an undesirably short product shelf life. To at least partially address this issue, containers have been contemplated in which two or more of the drink constituents may be separately stored in the one container assembly and combined shortly before consuming the drink. The applicant's existing International Patent Application PCT/AU2012/001072 contemplates such an assembly. Specifically, the applicant's existing application contemplates a fluid (for example, water) being stored in a container portion of an assembly, and a powdered dietary supplement separately stored in a compartment within or adjacent a container lid portion of the assembly. The assembly is designed for relatively simply and quickly adding the powder to the fluid prior to drinking the combined contents, following which the assembly can be discarded.

Other assemblies known to the applicant include those specifically designed for separately storing water and a supplement in tablet form within the one assembly. The tablet is then added to the water (and at least partially dissolved) shortly prior to drinking the combined contents.

Typically, existing assemblies include a release mechanism for releasing the solid constituent into the fluid. These assemblies (including that disclosed in the applicant's International Patent Application PCT/AU2012/001072) are usually designed to be single-use assemblies. That is, the solid constituent is added to the fluid and the combined contents are then consumed, following which the assembly is discarded. These types of assemblies provide no way of reloading (or refilling) the assembly with a solid constituent that can again be separately stored within the assembly from the fluid constituent.

It would therefore be desirable to provide a container assembly in which the contents may be stored for a relatively long time prior to combining and consuming and then, following consumption of the contents, at least a portion of the container assembly can be re-used to again separately store a solid substance and a fluid.

It would also be desirable to provide such an assembly in a relatively portable form that is easily stored and transported.

Further, it would also be desirable to provide an arrangement capable of storing, combining and dispensing a range of ingredients for a range of possible uses, and not necessarily limited to ingestible ingredients.

While the applicant has already contemplated an at least partially re-usable assembly, the applicant perceives that a further re-designed assembly may provide possible improvements and/or a possible range of new uses for such an assembly.

SUMMARY OF THE INVENTION

According to a broad aspect of the present invention there is provided an assembly. The assembly includes a container, with the container having a first end and an opposing second end. The assembly also includes a housing for removably receiving a cartridge of the type including a substance storage compartment for storing a substance therein. The housing is connectable to the second end of the container and, when connected to the container, the housing is movable relative to the container. A rupturing device is provided for rupturing the storage compartment upon relative movement between the housing and container, so as to combine any storage compartment contents with any container contents. The rupturing device is mounted within the container. A container opening is provided in the first end of the container. A closure is provided for sealing the container opening, the closure being movable between a closed position, and an open position for providing access to the container.

It is envisaged that the closure would be opened to allow the combined contents of the storage compartment and container to be consumed following rupture of the storage compartment.

In a preferred form, the second end of the container includes a container aperture and the housing includes a housing aperture, with the container aperture and the housing aperture combining to provide a fluid path between the cartridge and the container.

With a cartridge provided within the housing, movement of the housing towards the first end of the container preferably causes the rupturing device to rupture the storage compartment.

Preferably, movement of the housing towards the first end of the container is a relative linear movement, but a relative rotation of the housing towards the first end of the container is also contemplated.

The housing may include a first housing portion and a second housing portion, with the first and second housing portions being connectable together.

A releasable connection between the first and second housing portions is preferably provided. This allows access to the cartridge and replacement thereof, such that the assembly can be re-used. The releasable connection between the housing portions may be a releasable screw threaded connection.

A second releasable connection may also be provided between the housing and the container. In one possible form, the second releasable connection is a releasable snap-fit connection. The second releasable connection may include a push-button release mechanism for disengagement thereof.

It is envisaged that the second end of the container preferably corresponds to a base end of the container.

The rupturing device may be integrally formed with the container.

Preferably, the housing is moveable from a non-rupturing (ie storage) position, wherein any container contents are separately stored to any storage compartment contents; to a rupturing position, wherein the rupturing device ruptures the cartridge allowing any container contents to mix with any storage compartment contents. The rupturing device is preferably at least partially received within the storage compartment when in the rupturing position.

The cartridge may include a seal provided over an opening in the cartridge for rupture by the rupturing device when in the rupturing position.

It is envisaged that, in a particularly preferred form, the substance storage compartment contains a solid substance, such as a powdered substance; while the container contains a fluid.

According to another broad aspect of the present invention, there is provided a method of using an assembly. The method includes the steps of:

removably inserting a cartridge into a housing of the assembly, the cartridge of the type having a storage compartment containing storage compartment contents;

connecting the housing to a second end of a container of the assembly; adding container contents to the container through a container opening provided in a first end of the container;

sealing the container opening with a closure;

moving the housing relative to the container, such that a rupturing device provided within the container ruptures the storage compartment, so as to combine the storage compartment contents with the container contents;

removing the closure from the container opening; and consuming the combined storage compartment and container contents through the container opening.

The method may also include disconnecting the housing from the container; removing the cartridge from the housing; and inserting a replacement cartridge into the housing.

The method may further include the step of replenishing the container contents.

BRIEF DESCRIPTION OF THE DRAWINGS

It will now be convenient to hereinafter describe preferred embodiments of the invention with reference to the accompanying drawings. The particularity of the drawings is to be understood as not limiting the preceding broad description of the invention.

DETAILED DESCRIPTION

Referring to FIGS. 1 to 7, there is illustrated an assembly 10.

The assembly 10 includes a container 12. The container 12 may be manufactured from polypropylene, polyethylene terephthalate or other suitable material. The container 12 is designed to contain a fluid, such as water or other ingestible liquid.

The container 12 has a first end 14 and an opposing second end 16. The second end 16 of the container 12 corresponds to a base end of the container 12.

The assembly 10 further includes a housing 18, also manufactured from polypropylene, polyethylene terephthalate or other suitable material. The housing 18 is configured for removably receiving a cartridge 20. The cartridge 20 includes a substance storage compartment 22 for storing a solid, preferably powdered substance (not shown) therein.

The housing 18 is connectable to the second end 16 of the container 12. When connected to the container 12, the housing 18 is movable relative to the container 12 in a sliding, linear motion in the direction X (see FIG. 1).

A rupturing device 24 (see FIGS. 4 and 5) is provided for rupturing the storage compartment 22 upon relative movement between the housing 18 and the container 12, so as to combine any storage compartment contents with any container contents. The rupturing device 24 is mounted within and integrally formed with the container 12, although it is also contemplated that the rupturing device 24 may be separately formed to the container 12.

A container opening 26 is provided in (or proximate to) the first end of the container. A closure 28 is provided for sealing the container opening 26. The closure 28 is movable between a closed position (shown in FIGS. 1, 2, 5 and 6), and an open position (not shown) for providing access to the container.

The assembly 10 is designed such that the closure 28 would be opened by a consumer when it is desired to consume the combined contents of the storage compartment 22 and the container 12, following rupture of the storage compartment 22.

Figure 3:
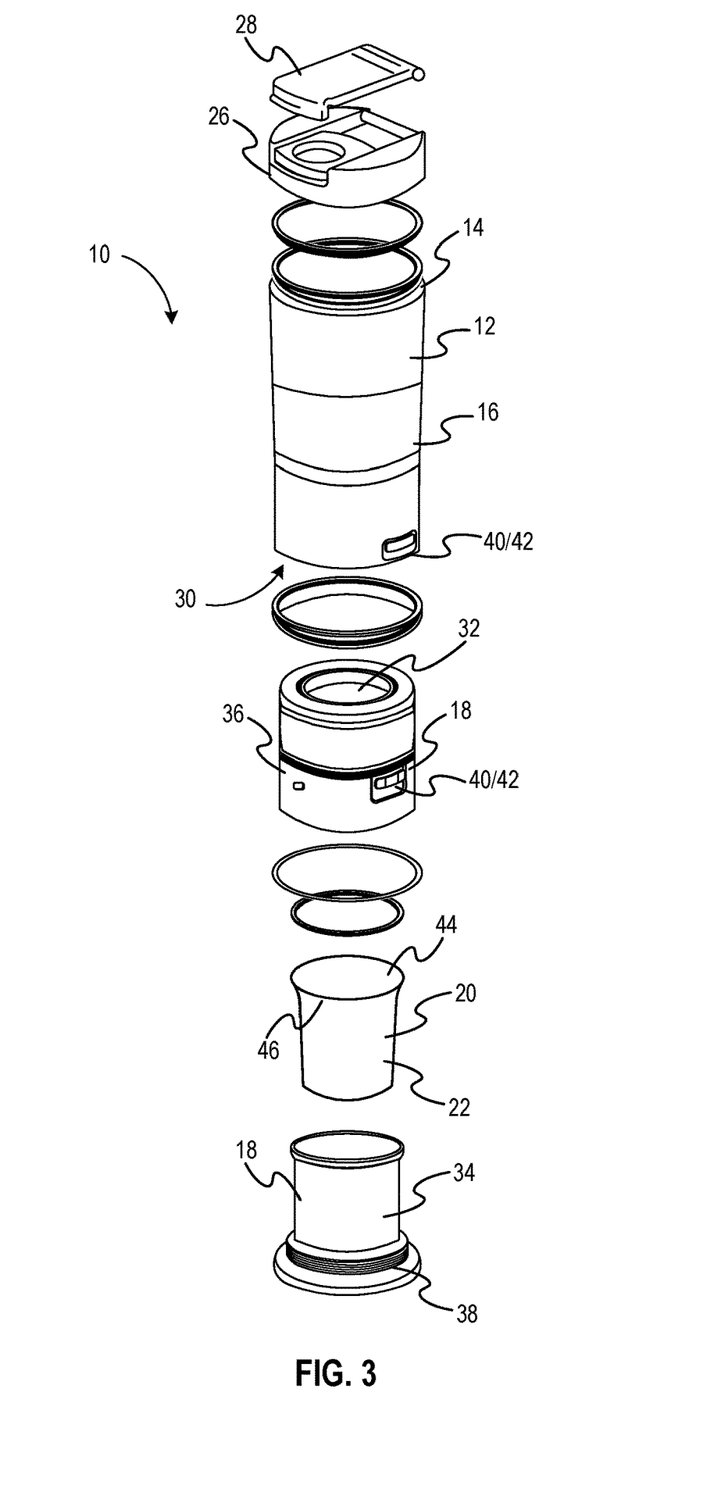
FIG. 3 is an exploded perspective view of the assembly illustrated in FIG. 1.
Figure 4:
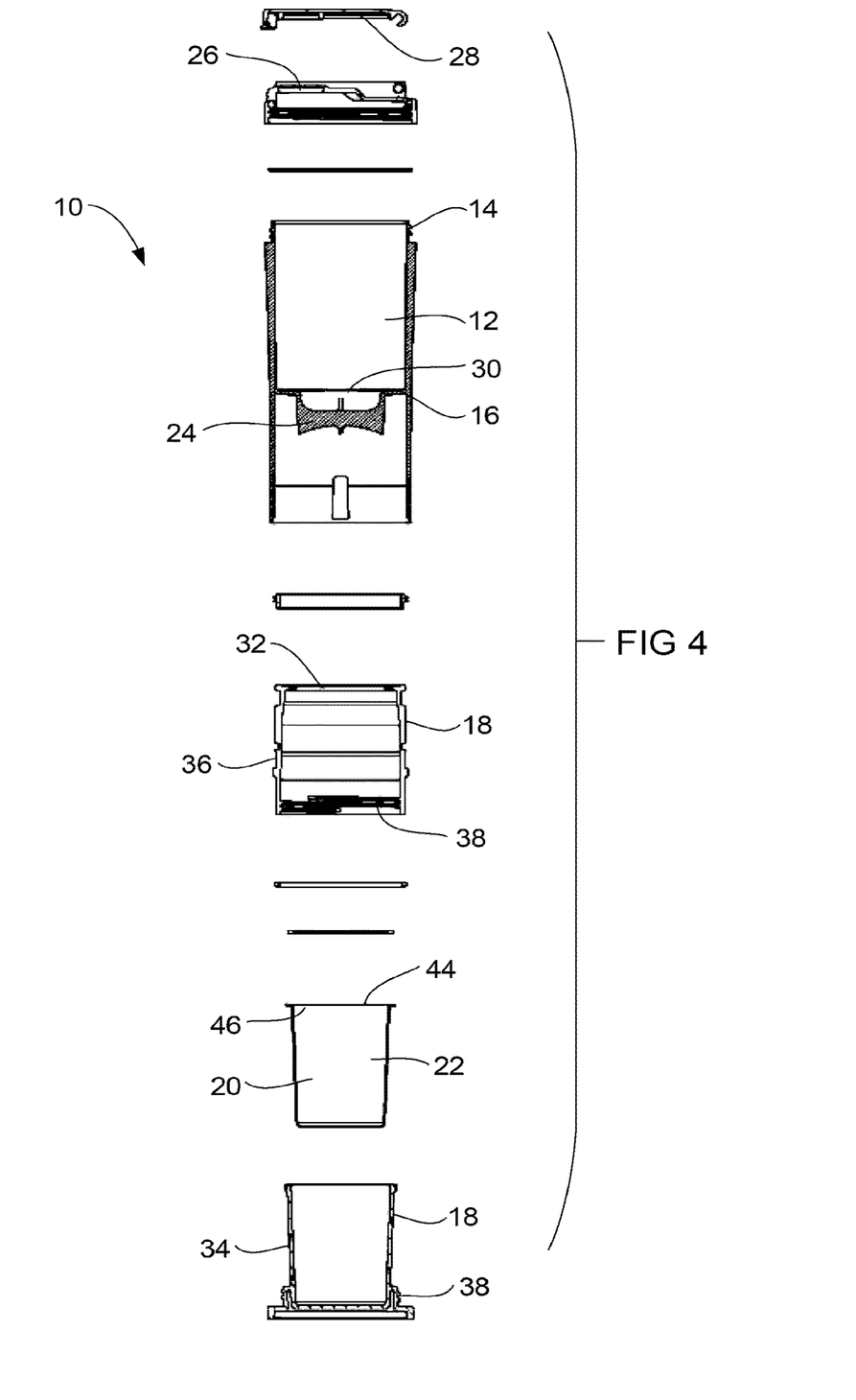
FIG. 4 is an exploded side view of the assembly illustrated in FIG. 1.
Figure 5:
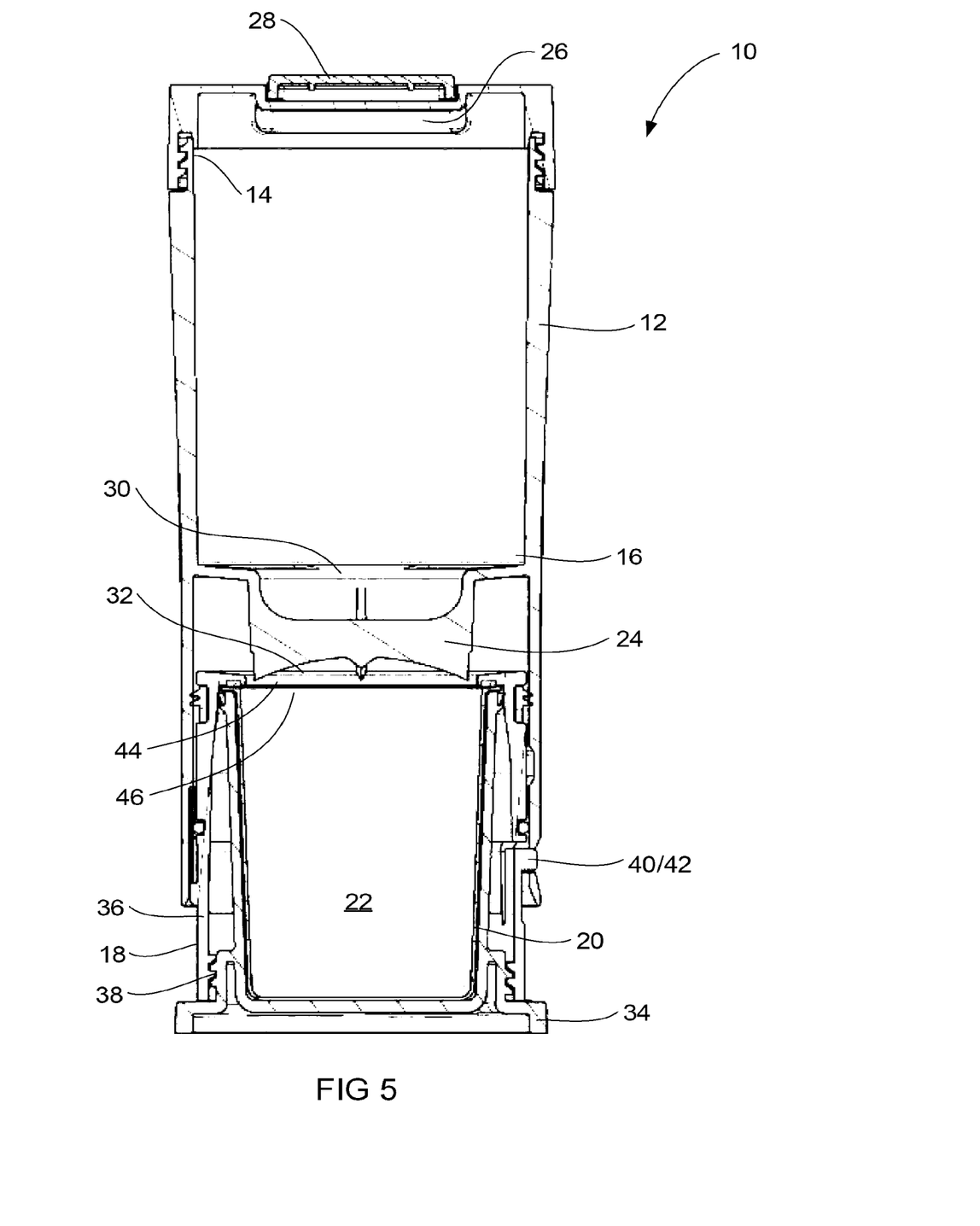
FIG. 5 is a sectional side view of the assembly shown in FIG. 1 when in the storage mode.

As most clearly shown in FIGS. 3, 4 and 5, the second end 16 of the container 12 includes a container aperture 30 and the housing 18 includes a housing aperture 32. The container aperture 30 and the housing aperture 32 combine to provide a fluid path between the cartridge and the container, which allows for the contents of the container 12 and storage compartment 22 to combine after the storage compartment 22 is ruptured.

With the cartridge 20 inserted into the housing 18, manual movement by the consumer of the housing 18 in the direction X towards the first end 14 of the container 12 causes the rupturing device 24 to rupture the storage compartment 22.

As most clearly shown in FIGS. 3 and 4, the housing 18 includes a first housing portion 34 and a second housing portion 36, with the first and second housing portions being releasably connectable together by a screw threaded connection 38. The provision of the screw threaded connection 38 allows access to the cartridge 20 and replacement thereof, such that the assembly can be re-used.

Figure 1:
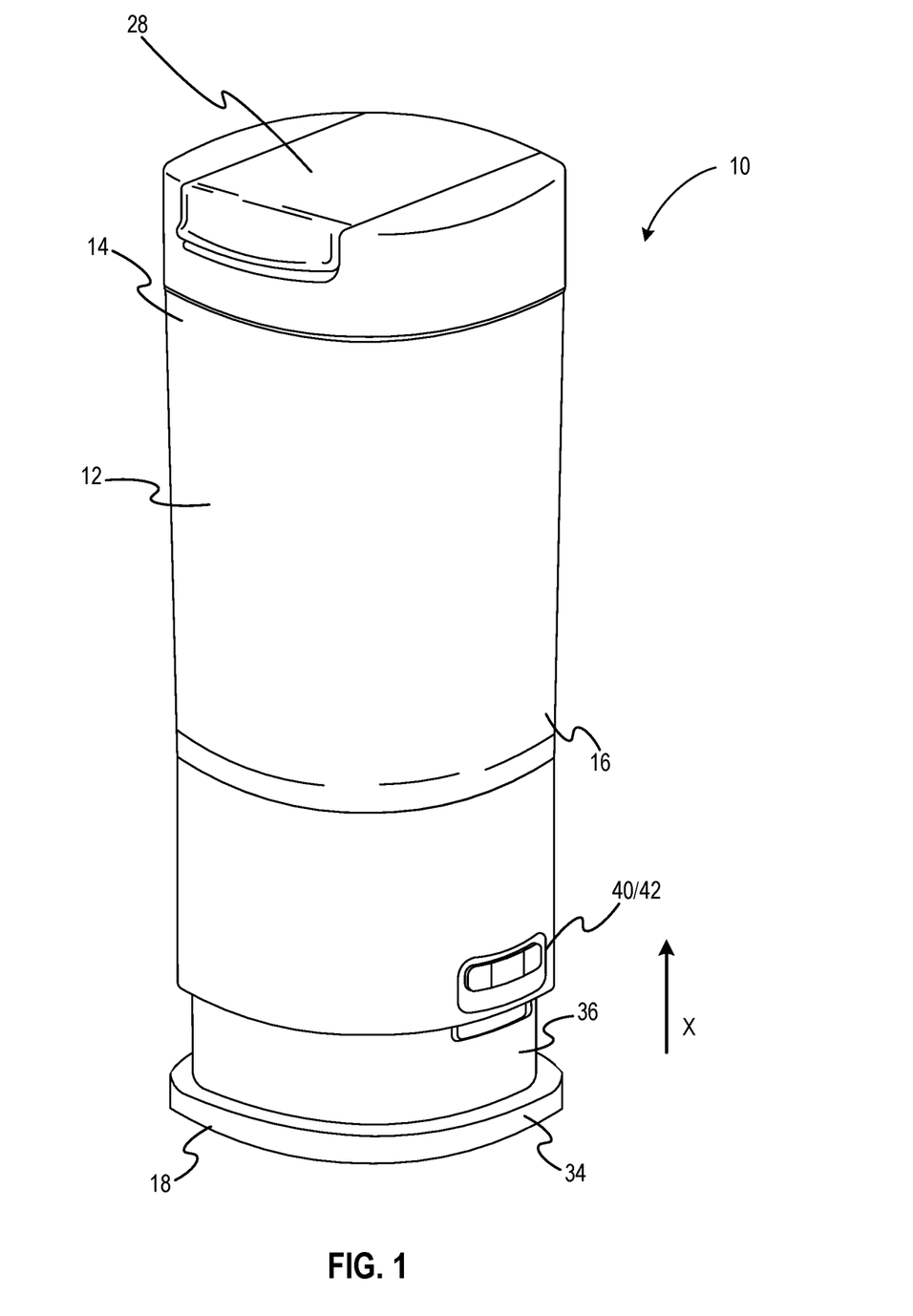
FIG. 1 is a perspective view of an assembly according to a first embodiment of the present invention in a storage mode.
Figure 2:
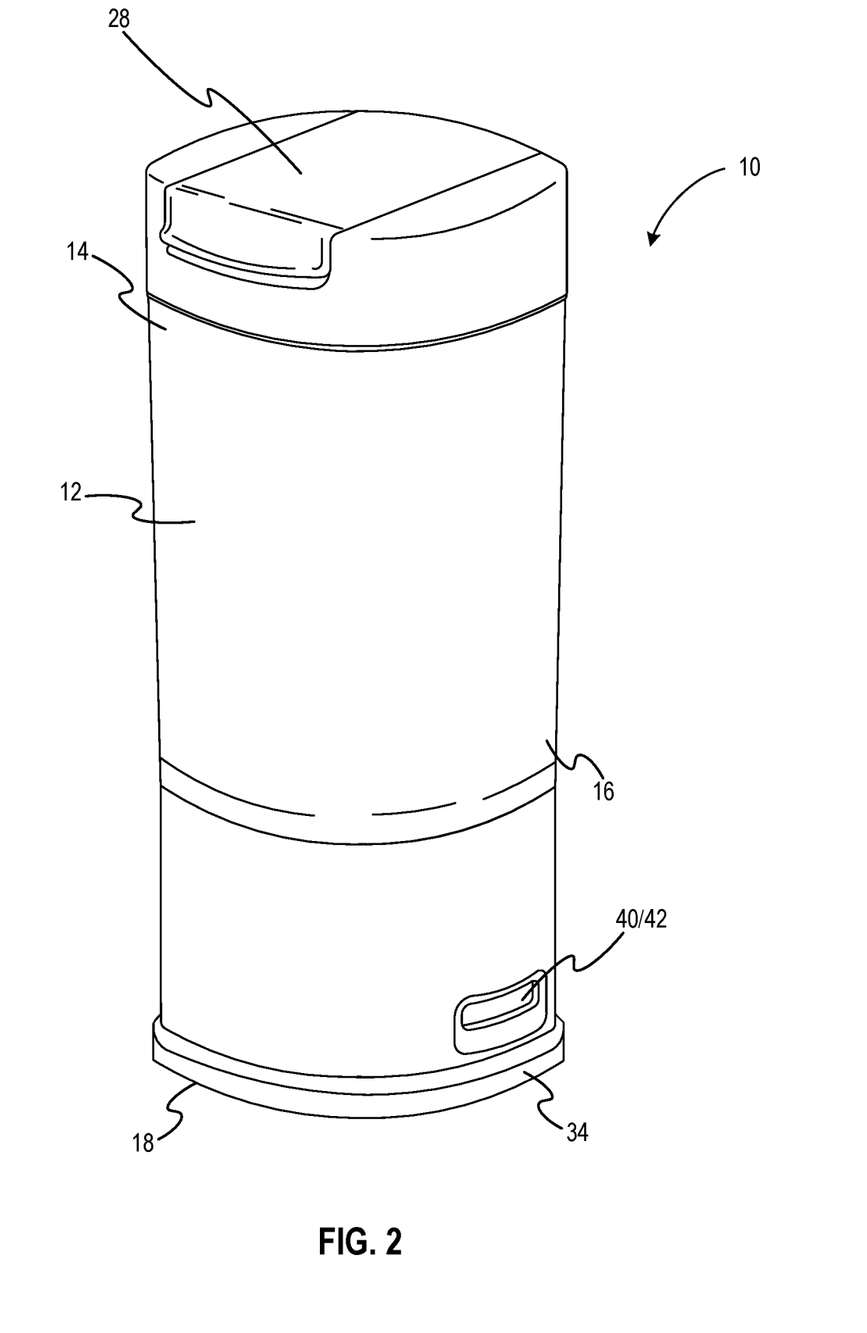
FIG. 2 is a perspective view of the assembly illustrated in FIG. 1, but with the assembly shown in a ready-to-consume mode.
Figure 6:
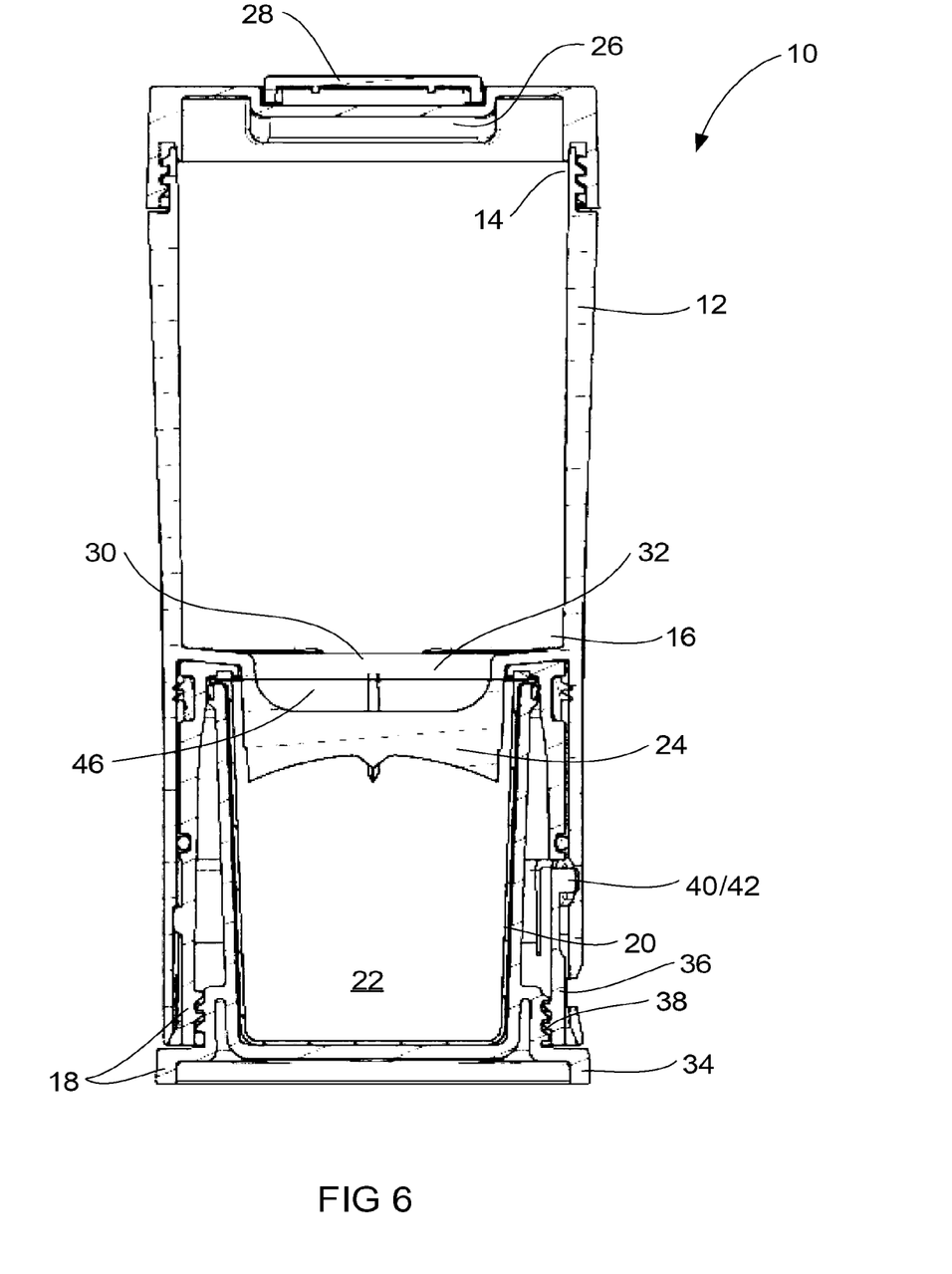
FIG. 6 is a sectional side view of the assembly shown in FIG. 1 when in the ready-to-consume mode.
Figure 7:
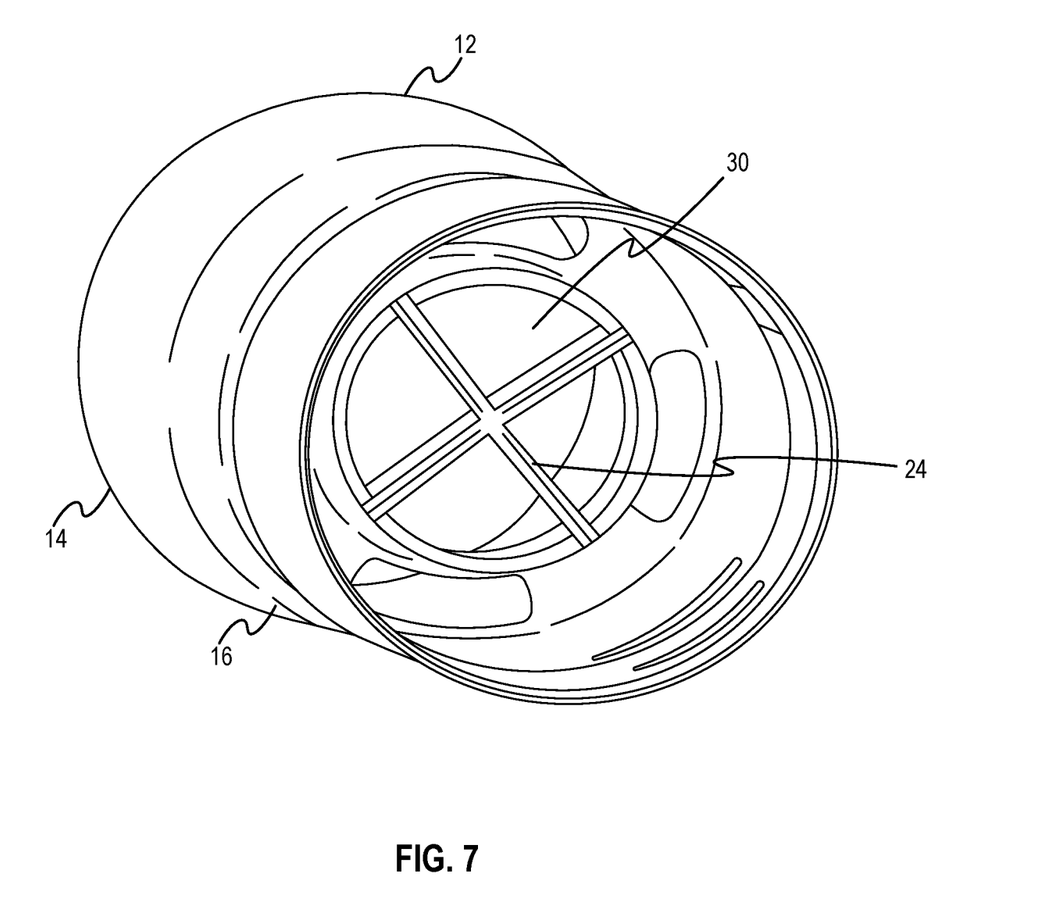
FIG. 7 is a perspective view of a portion of the assembly shown in FIG. 1.

A second releasable connection 40 is provided between the housing 18 and the container 12 in the form of a releasable snap-fit connection. The second releasable connection 40 includes a push-button release mechanism 42 for disengagement thereof. The connection 40 is designed such that it allows movement of the housing in the direction X relative to the container 12. In this regard, the housing 18 is moveable from a non-rupturing (ie storage) position, as shown in FIGS. 2 and 5, wherein any container 12 contents are separately stored to any storage compartment contents; to a rupturing position, as shown in FIGS. 3 and 6, wherein the rupturing device ruptures the cartridge 20 allowing any container contents to mix with any storage compartment 22 contents. It can be seen in FIGS. 3 and 6 that the rupturing device 24 is received within the storage compartment 22 when in the rupturing position.

So far, the description of the embodiment shown in FIGS. 1 to 7 has described the rupturing device 24 as being configured for rupturing the cartridge 20. More particularly, the rupturing device 24 is designed to rupture a seal 44 provided over an opening 46 in the cartridge 20. The rupturing device 24 is configured for creating a generally cross shaped rupture in the seal 44, and is also designed to prevent detachment of the seal 44 from the cartridge 20. Otherwise the seal 44 or fragments of the seal 44 may be inadvertently consumed with the ingestible contents of the assembly 10.

The assembly 10 can be used in the following manner. Firstly, a cartridge 20 filled with a desired ingestible solid, preferably powdered, substance is inserted into the housing 18, with the housing portions 34, 36 then connected together. The housing 18 (containing the cartridge 20) is then snap-fitted to the second end 16 of the container 12.

Container contents (in the form of a fluid, such as water or other ingestible fluid) can be added to the container 12 through a container opening 26. The container opening 26 is then sealed with the re-sealable closure 28.

When it is desired to consume the combine contents of the cartridge 20 and container 12, the housing 18 is moved relative to the container 12, such that the rupturing device 24 ruptures the storage compartment 22, so as to combine the storage compartment contents with the container contents. Once this has been done, the closure 28 may be removed from the container opening 26, such that the combined contents can then be consumed through the container opening 26.

It is to be appreciated that the container 12 may be depressed downwardly relative to the housing 18 to facilitate rupture of the storage compartment 22.

Once the combined contents of the container 12 and cartridge 20 have been consumed, the housing 18 may then be disconnected from the container so as to remove the cartridge 20 from the housing 18 and replace the removed cartridge with a replacement cartridge containing an ingestible solid, preferably powdered substance.

With a replacement cartridge in place, the container 12 can then be re-filled with water of other ingestible fluid, such that the assembly can be re-used.

Figure 8:
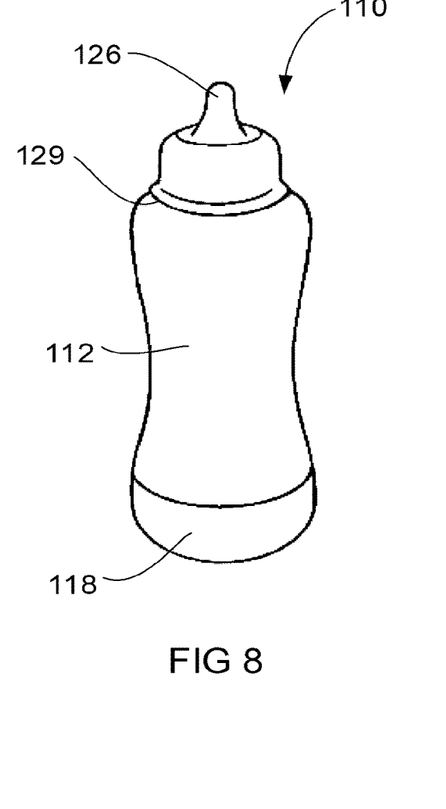
FIG. 8 is a perspective view of an assembly according to a second embodiment of the present invention.
Figure 9:
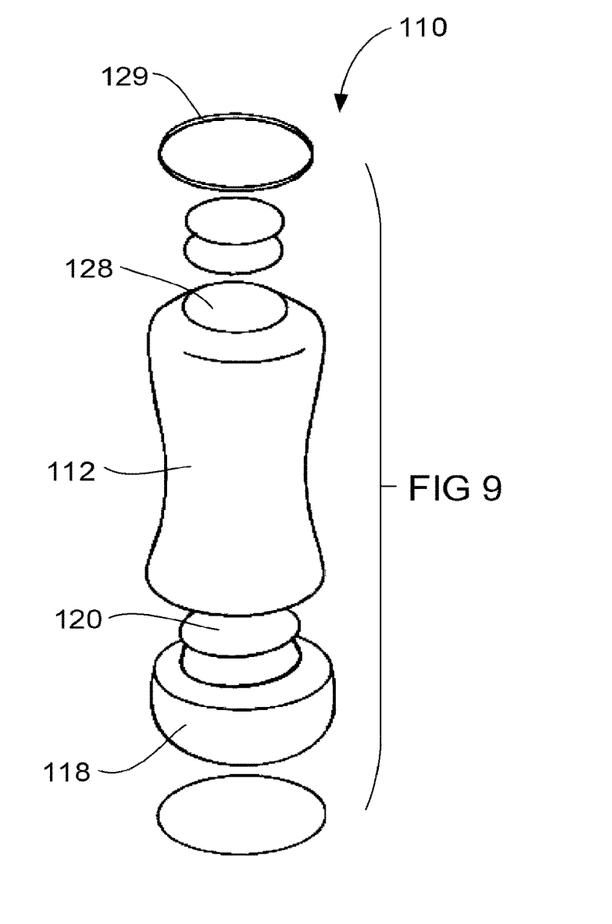
FIG. 9 is a perspective exploded view of the assembly illustrated in FIG. 8.

The embodiment shown in FIGS. 8 and 9 illustrates an assembly 110 in the form of a baby's bottle.

The assembly 110 includes a container 112 for containing water and a housing 118 for housing a cartridge 120 containing baby formula.

The assembly 110 allows the water and formula to be separately stored until shortly before consumption, whereupon a rupturing device (not shown) ruptures the cartridge 120 to combine the formula and water for consuming via the teat 126.

The teat 126 may be removed for storage, and a lid (not shown) placed over the opening 128 in the container 112 to prevent undesired leakage from the assembly prior to consumption. A screw-threaded collar 129 is provided for releasably connecting the teat 126/lid over the container opening 128.

Advantageously, the assembly 10/110 is re-usable, once a used cartridge 20/120 is replaced with a replacement cartridge. It is acknowledged that the applicant has previously contemplated an at least partially re-usable assembly, which is the subject matter of Australian patent application 2013204007. However, that design is considered by the applicant to be of a fundamentally different design to the present invention.

The assembly 10/110 is relatively portable and allows for the relatively easy storage and transport of separate ingestible constituents prior to combining and drinking.

The assembly 10/110 also allows an individual to tailor the contents of the assembly. In the case of athletes this may be particularly advantageous, because it allows individual athletes to tailor the contents of the assembly to meet their specific dietary requirements.

The design of the cartridge 20/120 and container 12/120 means that the assembly 10/110 can potentially store the separate ingestible constituents for a relatively long time prior to combining and consuming, which is both desirable and practical.

Moreover, it is to be appreciated that the assembly 10/110 advantageously has the potential for storing, combining and dispensing a range of ingredients for a range of possible uses, and is not necessarily limited to ingestible ingredients. These ingredients/uses include sports supplements, vitamins, super foods, meal replacements, dietary supplements, non-sport functional beverages, baby and infant formula and alcoholic beverages.

The previous discussion of existing patent documents is intended to facilitate an understanding of the invention. However, it should be appreciated that the discussion is not an acknowledgement or admission that any aspect of the discussion was part of the common general knowledge as at the priority date of the application.

Finally, it is to be understood that various alterations, modifications and/or additions may be introduced into the construction and arrangement of the parts previously described without departing from the spirit or ambit of this invention.

What is claimed is:

1. A method of using an assembly including:

removably inserting a cartridge into a housing of the assembly, the cartridge of the type having a storage compartment containing first contents, wherein the assembly comprises:
  a container having a first end and an opposing second end;
  the housing for removably receiving the cartridge;
  the housing configured to connect to the second end of the container and, when connected to the second end of the container, a portion of the housing configured to slide relative to the container in a linear direction toward the first end of the container;
  a rupturing device mounted within and stationary relative to the container, the rupturing device configured to rupture and enter the substance storage compartment upon the housing sliding relative to the rupturing device in the linear direction toward the first end of the container, wherein the housing slides relative to the rupturing device with respect to the linear direction only, wherein rupturing the substance storage compartment combines any storage compartment contents with any container contents;

a container opening provided in the first end of the container; and a closure provided for sealing the container opening, the closure configured to move between a closed position and an open position to provide access to the container;

connecting the housing to the second end of the container of the assembly;

adding second contents to the container through the container opening provided in the first end of the container;

sealing the container opening with the closure;

moving the housing relative to the container in the linear direction toward the first end of the container, such that the rupturing device provided within and stationary relative to the container ruptures the storage compartment and enters the storage compartment upon the housing moving in the linear direction toward the first end of the container, so as to combine the first contents with the second contents;

removing the closure from the container opening; and consuming the combined first and second contents through the container opening.

2. The method of claim 1, further comprising:
disconnecting the housing from the container;
removing the cartridge from the housing; and
inserting a replacement cartridge into the housing.

3. The method of claim 1, further comprising replenishing the second contents.

4. A method for using an assembly including a container having a first end and an opposing second end, the method comprising:

removably inserting a cartridge including a substance storage compartment for storing a substance therein into a housing of the container connected to the second end of the container, the assembly comprises:

the container having the first end and the second end opposing the first end;

the housing for removably receiving the cartridge;

the housing configured to connect to the second end of the container and, when connected to the second end of the container, a portion of the housing is configured to slide relative to the container in a linear direction toward the first end of the container;

a rupturing device mounted within and stationary relative to the container, the rupturing device configured to rupture and enter the substance storage compartment upon the housing sliding relative to the rupturing device in the linear direction toward the first end of the container, wherein the housing slides relative to the rupturing device with respect to the linear direction only, wherein rupturing the substance storage compartment combines any storage compartment contents with any container contents;

a container opening provided in the first end of the container; and a closure provided for sealing the container opening, the closure configured to move between a closed position and an open position to provide access to the container;

sliding the housing in the linear direction toward the first end of the container and relative to the rupturing device mounted within and stationary relative to the container;

rupturing the substance storage compartment by the rupturing device such that the rupturing device enters the storage compartment as a result of sliding the housing in the linear direction toward the first end of the container; and combining any storage compartment contents with any container contents subsequent to rupturing the substance storage compartment.

\* \* \* \* \*